US011360021B1

(12) United States Patent
Poquioma et al.

(10) Patent No.: US 11,360,021 B1
(45) Date of Patent: Jun. 14, 2022

(54) AUTOMATIC INTERFACE DETECTION

(71) Applicant: JP3 Measurement, LLC, Austin, TX (US)

(72) Inventors: Walter Ernesto Poquioma, Broken Arrow, OK (US); David K. Pinkerton, Auburn, WA (US); Ronald Dove, Mount Airy, MD (US); Aurora Weiden, Austin, TX (US); Nathanial Watson, Victor, MT (US)

(73) Assignee: JP3 Measurement, LLC, Austin, TX (US)

( * ) Notice: Subject to any disclaimer, the term of this patent is extended or adjusted under 35 U.S.C. 154(b) by 0 days.

(21) Appl. No.: 17/542,103

(22) Filed: Dec. 3, 2021

Related U.S. Application Data

(60) Provisional application No. 63/173,820, filed on Apr. 12, 2021.

(51) Int. Cl.
*G01N 21/3577* (2014.01)
*G01N 21/359* (2014.01)
*G01N 21/85* (2006.01)

(52) U.S. Cl.
CPC ....... *G01N 21/3577* (2013.01); *G01N 21/359* (2013.01); *G01N 21/85* (2013.01)

(58) Field of Classification Search
CPC .. G01N 21/3577; G01N 21/359; G01N 21/85; G01N 21/25
See application file for complete search history.

(56) References Cited

U.S. PATENT DOCUMENTS

| 2010/0211329 | A1* | 8/2010 | Farquharson | G01N 21/3577 |
| | | | | 702/28 |
| 2015/0098083 | A1* | 4/2015 | Lambert | G01N 21/85 |
| | | | | 356/432 |

* cited by examiner

*Primary Examiner* — Hina F Ayub
(74) *Attorney, Agent, or Firm* — DuBois, Bryant & Campbell, LLP; William D. Wiese

(57) ABSTRACT

Methods and systems for near-real-time measurement and analysis of a fluid flowing through a pipeline. Analysis of the spectra of the fluid may be used to determine when a stable first pipeline fluid transitions into a transmix and then further transitions into a stable second pipeline fluid. By comparing the characteristics of the changing spectrum of fluids flowing through a pipeline as they transition from a first stable fluid, through a transmix phase, to a second stable fluid, this process can be achieved without the need to measure compositional or physical properties of the fluids or transmixes thereof.

15 Claims, 7 Drawing Sheets ific fluids in a
especially chal-

AUTOMATIC INTERFACE DETECTION

PRIORITY STATEMENT UNDER 35 U.S.C. § 119 & 37 C.F.R. § 1.78

This non-provisional application claims priority based upon prior U.S. Provisional Patent Application Ser. No. 63/173,820 filed Apr. 12, 2021, in the names of Walter Ernesto Poquioma, David K. Pinkerton, Ronald Dove, Aurora Weiden, and Nathanial Watson entitled "AUTOMATIC INTERFACE DETECTION" the disclosures of which are incorporated herein in their entirety by reference as if fully set forth herein.

FIELD OF THE INVENTION

The present disclosure relates to the processing of fluids in a pipeline and, more specifically, to the near-real-time identification of the transition between different fluids as they are transported through a pipeline.

BACKGROUND OF THE INVENTION

Crude oil from individual oil wells is transported through pipelines to individual vessels generally located at or near the well site. From there, the oil may undergo further separation, treating, heating, dehydrating, compressing, blending, pumping or other processing activities before being transported downstream, via truck, pipeline, rail car or other transportation method. It can enter into gathering lines to a point where it enters a common carrier pipeline and eventually arrives at the refinery. There, crude oil is converted into fuel and other refined products and transported to terminals through common carrier pipelines.

There are many instances in this process where different fluids, or mixtures of different fluids, are transported through a single pipeline. A mixture of multiple fluids (aka, a transitional mixture or "transmix") occurs at an interface where different fluids in a pipeline meet and mix. Generally, the transmix cannot be sold as either of its constituent fluids and is therefore usually routed to a tank for storage and subsequent sale at a reduced price.

The current standard for assessing the type of fluid present in a pipeline is determining the characteristics of the fluid, such as its relative density or API gravity, flash point, vapor pressure, water content, and/or basic solids and water content ("BS&W"). For example, in the past oil produced from conventionally drilled wells with certain API numbers would generally all have similar compositional values. However, this general correlation is increasingly being challenged. One of the biggest contributing factors challenging this historical assumption is new production from unconventional shale formations. This shale crude oil tends to be much lighter (higher API gravity number) and can vary significantly in composition from well to well, and even from within an individual well. The amount of time the crude is stored in a tank can also have an effect on the composition. As the crude sits, it becomes "weathered", meaning some of the lighter components have flashed off and been vented, flared, or injected into the gas phase pipeline leaving the production facility. The increasing and changing sources of production have also resulted in the comingling of various streams from different sources to generate oil with specific desired properties, resulting in much different hydrocarbon compositions of blended oil than previously seen. This variability between fluids makes the determination of a transition between specific fluids in a pipeline in the field especially challenging.

Testing to determine if a sample of fluid flowing through a pipeline is stable or is part of a transmix has historically required lab testing the physical properties of a sample of the fluid that has been physically removed from the pipeline using the process described above. As one might imagine, since this is a manual process, it is very slow and time consuming. Moreover, since the operator has no way of confirming precisely when the flow of the transmix has ended, the operator typically tests a large amount of stable fluid to ensure that it is no longer transmix.

Accurately detecting when the transmix region starts and ends results in significant savings by minimizing the amount of waste material generated, and reducing the logistical complications involved in storing and testing supposed transmixes. Accurately detecting when the transmix region starts and ends can also be important in those cases in which two stable fluids have the same physical property but may not be the same fluid. For example, two types of crude oil may have the same API gravity value, but totally different compositions. In these cases, the lab testing of the physical properties may not be able to identify the two types of crude oil and their transmix.

There is a need, therefore, for a method and system for determining if a sample of fluid flowing through a pipeline is stable or is part of a transmix without the need for lab testing the physical properties of a sample of the fluid that has been physically removed from the pipeline. Such a method and system would help detect when the transmix region starts and ends resulting in significant savings by minimizing the amount of waste material generated and reducing the logistical complications involved in storing and testing supposed transmixes.

SUMMARY OF THE INVENTION

Embodiments of the method and system disclosed herein teach the use of a spectroscopic analyzer, such as a near-infrared spectrometer, to distinguish the optical signatures between various fluids flowing through a pipeline and their interfaces in near-real-time while the fluids are in the process of being actively transported through a pipeline. By examining and comparing the spectral information of the fluids flowing through a particular portion of a pipeline, one may be able to determine in near-real-time when a first fluid begins being mixed with a second fluid, forming a transmix, and when the second fluid is stable and no longer mixed with the first fluid flowing through the pipeline. In addition, stable fluids flowing through a pipeline can be classified and labeled so that, for example, its identity can be communicated to a customer.

In various embodiments, a spectroscopic analyzer, or spectrometer, can be used to measure and record spectral information of a fluid flowing through a pipeline in near-real-time. Analysis of the spectra of the fluid over time may be used to determine when a stable first pipeline fluid transitions into a transmix and then further transitions into a stable second pipeline fluid. By comparing the characteristics of the changing spectrum of fluids flowing through a pipeline as they transition from a first stable fluid, through a transmix phase, to a second stable fluid, this process can be achieved without the need to measure compositional or physical properties of the fluids or transmixes thereof. Moreover, because we are interested in changes in the spectra, the process of identifying transmixes can be performed without the need for calibration samples to build chemometric models of the fluids.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to improved methods and systems for, among other things, the spectral analysis of fluids flowing through a pipeline to determine when a transmix of fluids has started and ended. The configuration and use of the presently preferred embodiments are discussed in detail below. It should be appreciated, however, that the present invention provides many applicable inventive concepts that can be embodied in a wide variety of contexts other than determining the presence of a transmix. Accordingly, the specific embodiments discussed are merely illustrative of specific ways to make and use the invention, and do not limit the scope of the invention. In addition, the following terms shall have the associated meaning when used herein:

"fluid" means any liquid or gas, including but not limited to crude oil, refined fuel or natural gas.

"fluid infrastructure" means any production, transportation, storage or other infrastructure used in connection with the collection, processing, storage, transmission or distribution of a fluid including, without limitation, if the fluid is a hydrocarbon, any infrastructure between the wellhead and the point of retail delivery; and "pipeline" means any location within the fluid infrastructure, including a pipeline or other component used in the collection, processing, storage, transmission or distribution of a fluid.

Figure 1:
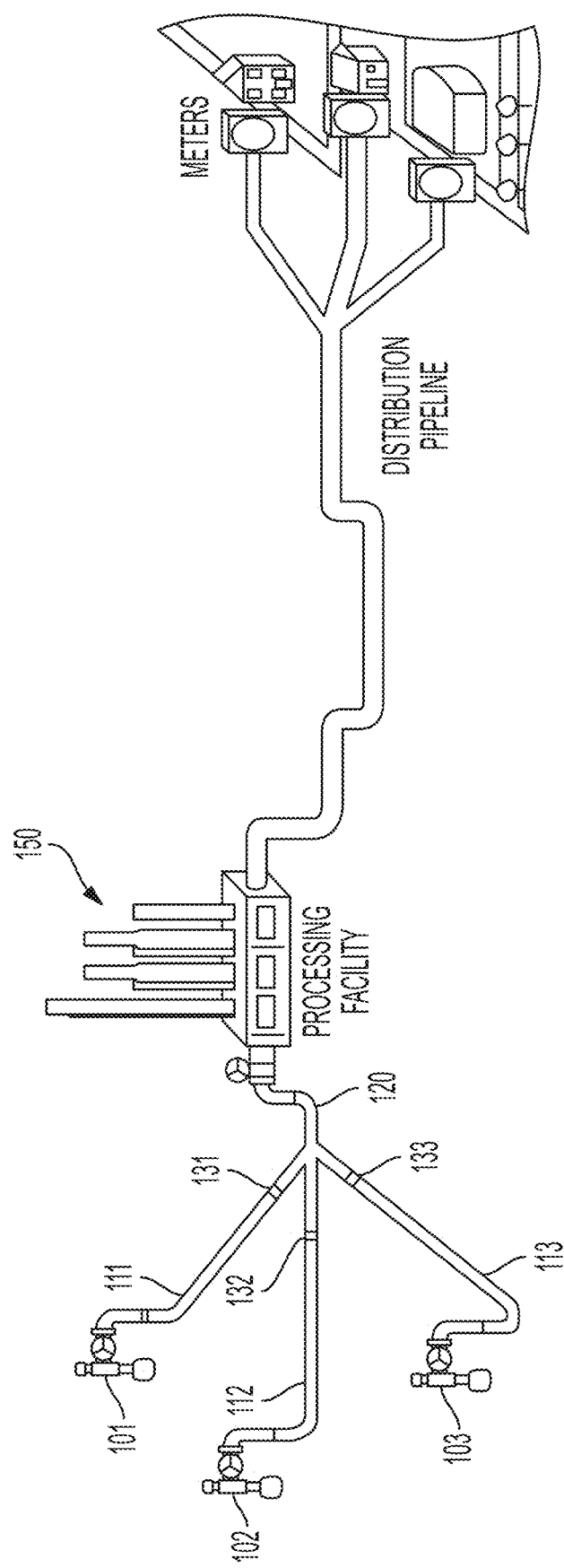
FIG. 1 depicts an oil transmission and processing system that would beneficially utilize embodiments of the present invention.

Referring now to FIG. 1, which depicts a typical fluid infrastructure system known in the art, including transmission pipelines 111, 112 and 113 used to transport fluid from wellheads 101, 102 and 103 to a downstream line 120 and on to the refinery 150. The energy content and specific hydrocarbon speciation of fluid flowing from wellhead 101 may be different than the energy content and speciation of the fluid flowing from wellhead 102. Similarly, the characteristics in fluid flowing from wellhead 101 may be different than those in the fluid flowing from wellhead 102 or 103. Fluids from wellheads 101, 102 and 103 may enter pipeline 120 at different times, thereby resulting in a transmix until such time as a single fluid is again flowing into such pipeline. Inasmuch as many fluids, such as oil and gas, are bought and sold based on energy content and/or the speciation of that hydrocarbon, it is often necessary or desirable to determine the point at which the flow of such transmix begins and ends in situ in real time.

There are numerous reasons why it may be advantageous to determine the presence of a transmix fluid in the transmission lines in real time. For example, it would also be useful to know when a transmix was entering a common carrier line from each transmission line in real time so that the common carrier line can be monitored, blended with other streams, and adjusted as desired to meet individual refinery specifications. In addition, it would allow the refineries to significantly increase their production efficiency and thus profit margins by monitoring incoming fluid composition and having the certainty that comes with knowing a transition between different fluids is underway in near real time.

As another example, it would also be useful to monitor refined products, such as gasoline, diesel fuel, jet fuel, heating oil, etc., as they are leaving the refinery through distribution pipelines. By doing so, it would be possible to detect the interface between different types of those refined fuels in real time to avoid the situation in which a transmix is sent to a tank containing a stable fuel. Once again, this capability would allow refineries to significantly increase their profit margins by ensuring that only stable products are delivered to the appropriate tank resulting in the ability to charge higher prices because the product is consistent in quality.

Figure 2:
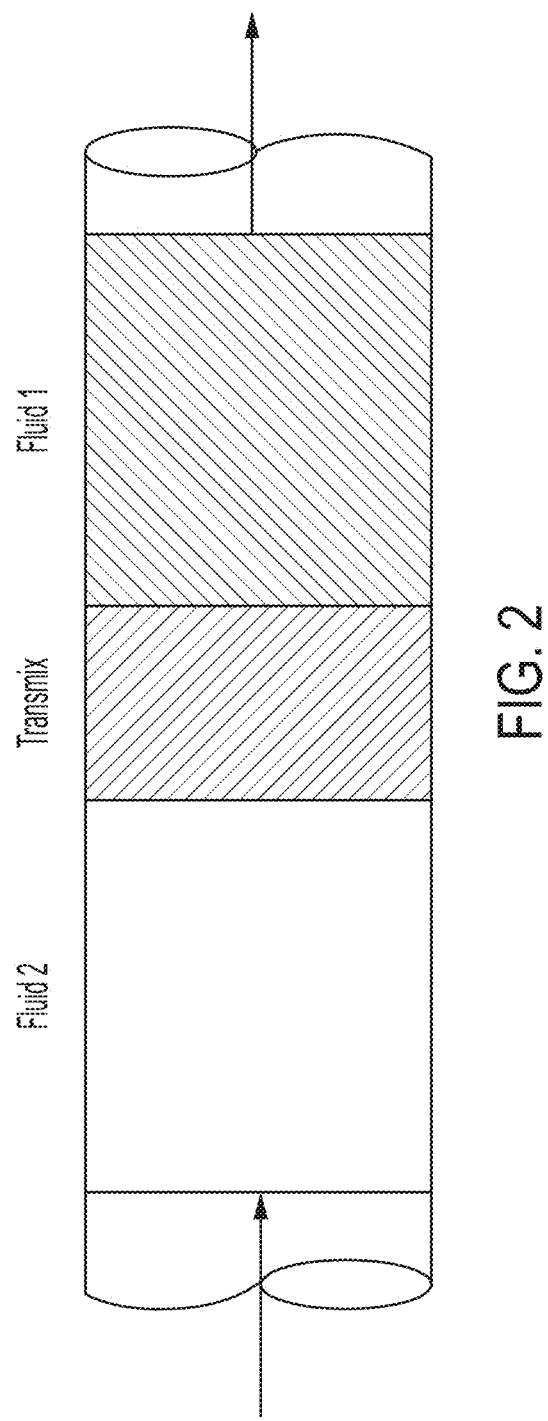
FIG. 2 is an illustration depicting a pipeline having a first fluid flowing through a pipeline followed by a second fluid flowing through the pipeline. In between the first and second fluids, there is shown a transmix section in which the first fluid and second fluid are mixed together.

FIG. 2 illustrates a first fluid flowing through a pipeline followed by a second fluid flowing through the same pipeline. In between the first fluid and the second fluid, a transmix section in which the first fluid and second fluid are mixed.

Figure 3:
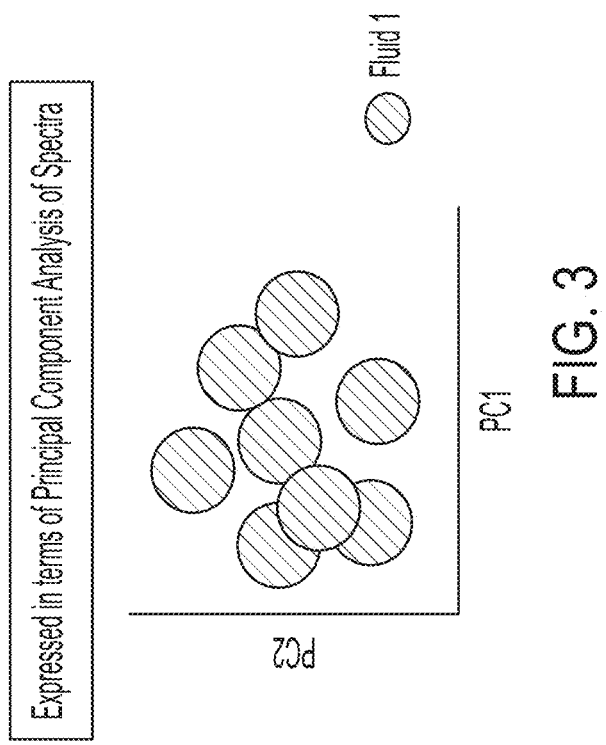
FIG. 3 shows a process map having a cluster of datapoints representing spectral information for a plurality of samples of a first fluid in a pipeline.

FIG. 3 shows a process map having a cluster of datapoints representing spectral information for a plurality of samples of the first fluid flowing through the pipeline. Here, because the fluid is a stable product the datapoints representing the spectral information of samples of the fluid are clustered closely together.

Figure 4:
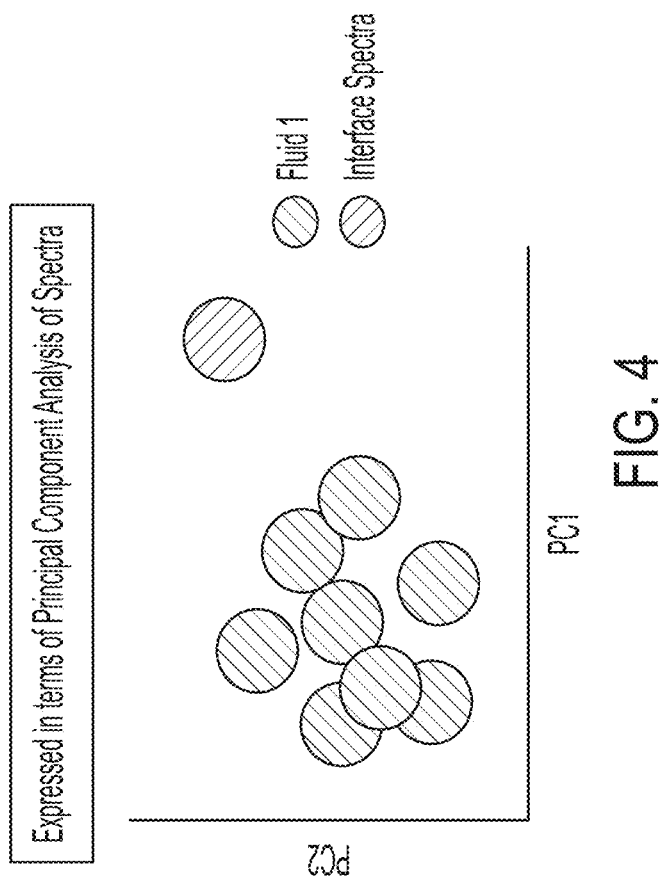
FIG. 4 shows a process map having a cluster of datapoints representing stable samples of the first fluid in a pipeline, as shown in FIG. 3, with an additional, outlier, datapoint significantly removed from the first fluid's cluster of spectral datapoints.

FIG. 4 shows a process map having a cluster of datapoints representing stable samples of the first fluid flowing through the pipeline, as shown in FIG. 3, with an additional, outlier, datapoint significantly removed from the first fluid's cluster of spectral datapoints. The fact that the new datapoint is significantly removed from the first fluid's cluster indicates that the spectral information for the sample represented by the outlier datapoint is significantly different from the spectral information for the first fluid, suggesting in turn that the fluid flowing through the pipeline is transitioning from the first fluid to a second fluid.

Figure 5:
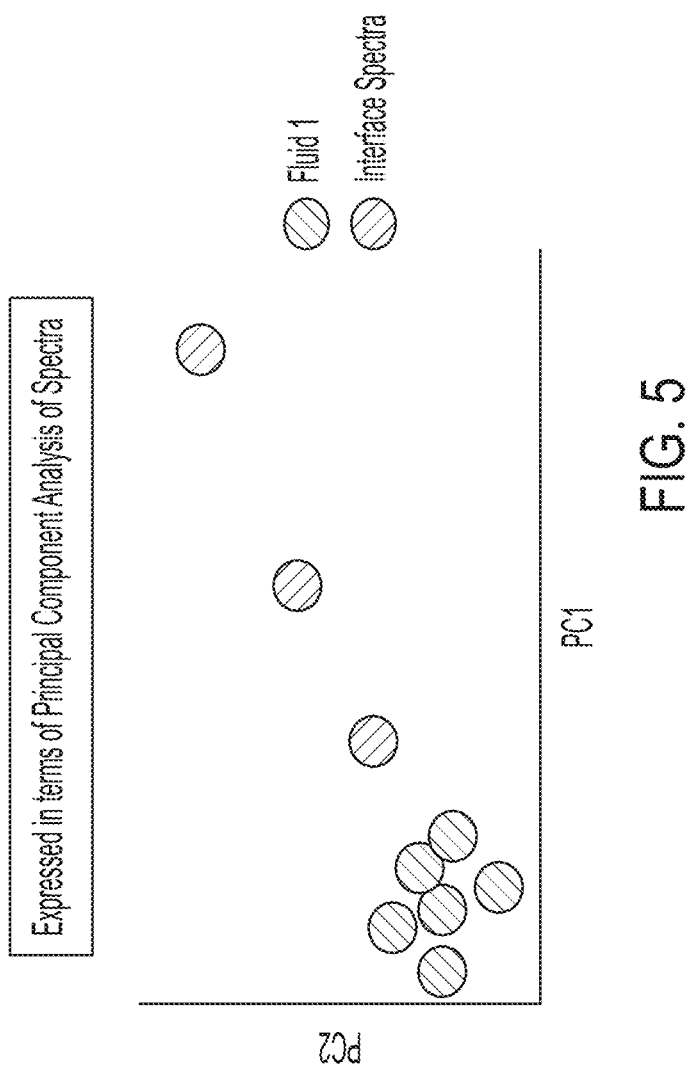
FIG. 5 shows a process map having the dataset of FIG. 4 with two further outlier datapoints.

FIG. 5 shows a process map having the dataset of FIG. 4 with two further outlier datapoints. The two new datapoints in FIG. 5 show spectral information from measurements that differ even further from those in the cluster associated with the first fluid. Moreover, not only do the spectra differ from the first fluid, but these spectra are also significantly different from each other which highlights that the fluid is still in a state of transition. In other words, it is not only the fact that the spectra for the new data points are separated from the cluster that advises that they are in transmix but the fact that the spectra differ from each other. This suggests that the fluid flowing through the pipeline at the time corresponding to those measurements has spectral characteristics that are further and further away from those associated with the first fluid which, along with the fact that the spectra for the new data points are different from one another, suggests that the fluid in the pipeline is still in a state of flux, transitioning away from the first fluid.

Figure 6:
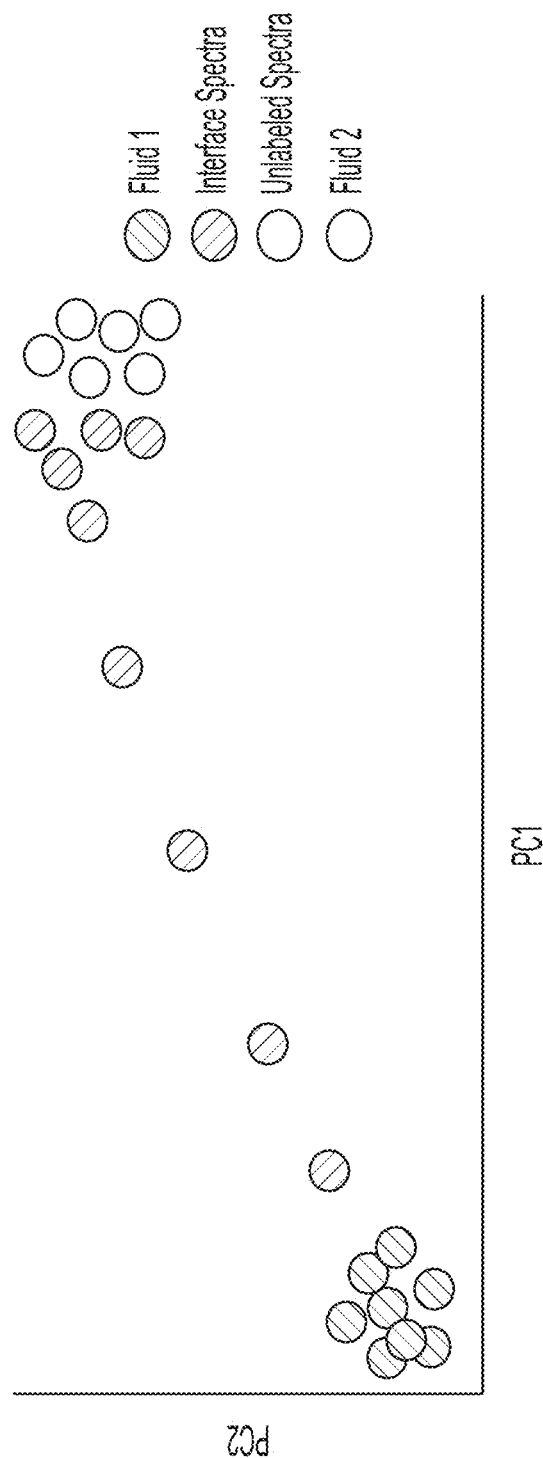
FIG. 6 shows a process map having the dataset of FIG. 4 with several additional datapoints representing the spectra information of the fluid flowing through the pipeline as time continues, with several new datapoints forming a second cluster.

FIG. 6 shows a process map having the dataset of FIG. 5 with several additional datapoints representing the spectra information of the fluid flowing through the pipeline as time continues, with several of the new datapoints forming a second cluster. As the fluid flowing through the pipeline consists less of the first fluid and more of the second fluid, the spectral information from samples taken from the pipeline can be seen starting in a first cluster that is associated with the first fluid, then, in some instances, relatively rapidly changing through a transition section representing the transmix fluid where there is an interface between the first fluid and the second fluid, and finally re-stabilizing and forming a second cluster that is associated with a stable second fluid.

In various embodiments, the datapoints representing spectral information from samples of fluids flowing through a pipeline may be projected in a cartesian space configured such that the proximity of datapoints reflects a similarity in the respective samples' spectral information. In such embodiments, once projected, a distance metric may be utilized to distinguish stable versus changing spectra, and therefore stable pipeline fluids versus transmixes. Datapoints which are clustered are deemed to be stable fluids and datapoints which are projected further away from a cluster indicate that the fluid flowing through the pipeline has changing spectral characteristics from the stable fluid and may be labeled as a transmix.

In various embodiments, the spectra may be projected into a principal component analysis (PCA) space. In such embodiments, the projection of points that represent the spectra of stable fluids will be clustered together due to their similar composition. As will be appreciated by those skilled in the art, principal component analysis is only one form of spectral conversion. For example, the mapping from the raw spectra to the product label can be done by a supervised machine learning algorithm for classification where the raw spectra may or may not have mathematical preprocessing applied prior to classification. In those embodiments which include preprocessing, the preprocessing may include dimensionality reduction or any other mathematical transformation.

The product labeling based on the cluster position on the projected PCA space described above forms a unique and important aspect of various embodiments of the present invention. For example, if a first stable fluid flows through a pipeline and that fluid is followed by a second stable fluid, embodiments of the invention described herein will detect the start and end of the transmix between the two fluids as described above. However, in addition to identifying transmixes, an algorithm, such as the machine learning algorithm described above, may also be used to verify the identity of the first fluid and the identity of the second fluid. That information may then, for example, be transmitted as a product code or a product label to a customer.

Figure 7:
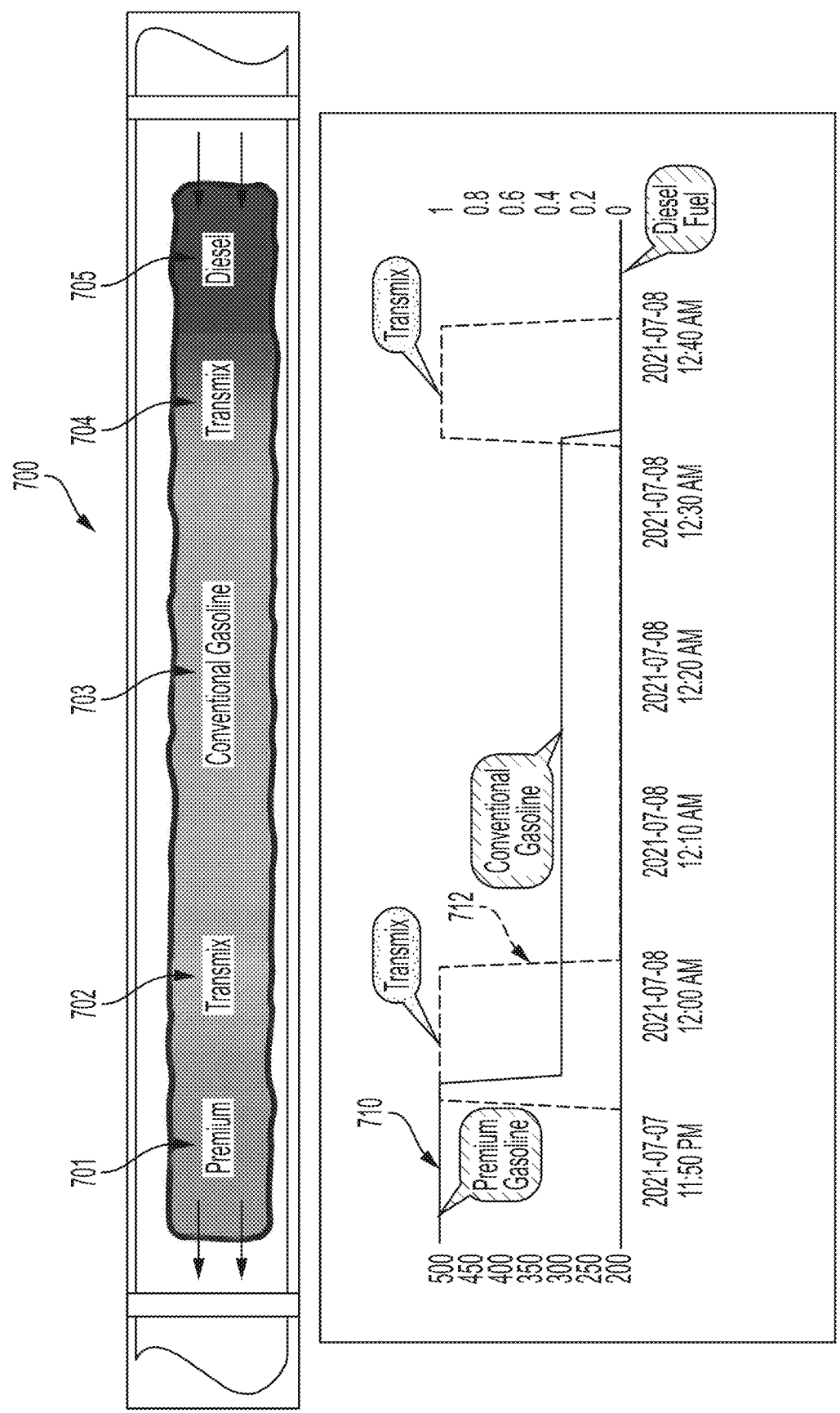
FIG. 7 is an illustration depicting an exemplary pipeline having premium gasoline flowing through a pipeline followed by conventional gasoline flowing through the pipeline, followed by diesel flowing through the pipeline. In between each fluid, there is shown a transmix section in which the respective fluids are mixed together.

Referring now to FIG. 7 showing an exemplary pipeline having premium gasoline 701 flowing through the pipeline 700 followed by conventional gasoline 703 flowing through the pipeline 700, followed by diesel 705 flowing through the pipeline 700. In between each fluid, there is shown a transmix section 702, 704 in which the respective fluids are mixed together. Those skilled in the art will appreciate that, for example, the fluid in transmix section 702 could also be identified as "downgrade" since it can be sold as conventional gasoline and that other forms of transmixes may also have unique identifiers. However, as used herein, "transmix" is used to identify any mix of two separate fluids.

A representative output from an algorithm such as described above is shown beneath the depiction of the pipeline in FIG. 7. In this instance, there are two metrics shown. Line 710 represents product identification, or product labeling, with reference to the left y-axis. In this instance, the line shows the transition from premium gasoline 701 (Product 500) to conventional gasoline 703 (Product 300) to diesel 705 (Product 200). Line 712 represents the interface indication with reference to the right y-axis, wherein the interface equals 1 during transition between fluids and interface equals zero during the flow of a stable fluid. Therefore, the algorithm not only tells in real time when the transmix starts and ends, the algorithm also shows when the fluid is stable.

Embodiments of the system and method disclosed herein may use spectral information gathered from the near-infrared spectrum (generally from about 780 nm to about 2500 nm) in determining the fluids flowing through the pipeline and their respective interfaces.

In some embodiments, the fluid infrastructure system may comprise a sensor capable of obtaining spectral information from the fluids flowing through a pipeline in situ while undergoing continuous flow and in near-real-time. This allows for more rapid and accurate detection and routing of transmixes.

In some embodiments, the steps of recording, projecting, and analyzing the spectral information from fluid samples may be performed by a microprocessor configured for such tasks.

In some embodiments, the fluids being sampled may comprise one or more hydrocarbon fluids, including but not limited to: refined petroleum products, crude petroleum products, and natural gas liquids.

In one specific embodiment, a fluid infrastructure comprises a first fluid flowing through a pipeline in the fluid infrastructure followed by a second fluid flowing through the pipeline, wherein a transmix of the first fluid and the second fluid flows between the first fluid and the second fluid. A spectrometer is located at a point in a pipeline to measure and record spectral information of fluids flowing through the pipeline. As the first fluid flows past the spectrometer, spectral information from the first fluid is generated by the spectrometer and projected in a cartesian space to create a first cluster. As the transmix flows past the spectrometer, spectral information from the transmix is generated by the spectrometer and projected in the cartesian space. If the distance between the spectral information of the first cluster and the spectral information of the transmix projected in the cartesian space exceeds a pre-determined value, the flow of the transmix is diverted from the pipeline to an alternative pipeline. As the second fluid flows past the point in the pipeline, spectral information from the second fluid is generated by the spectrometer and projected in the cartesian space and, at such time as the spectral information of the second fluid forms a second cluster, the flow of the second fluid is diverted from the pipeline to a second alternative pipeline.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for monitoring fluid flow known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112(f) unless the words "means for" or "step for" are explicitly used in the particular claim.

We claim:

1. A fluid infrastructure, comprising:
    a first fluid flowing through a pipeline in the fluid infrastructure followed by a second fluid flowing through the pipeline, wherein a transmix of the first fluid and the second fluid flows between the first fluid and the second fluid;
    a spectrometer located at a point in a pipeline to measure and record spectral information of fluids flowing through the pipeline without reference to a calibration sample;
    wherein as the first fluid flows past the spectrometer, spectral information from the first fluid is generated by the spectrometer and projected in a cartesian space to create a first cluster, wherein a close proximity of spectral information in the first cluster indicates a consistent composition of the first fluid flowing through the pipeline,
    as the transmix flows past the spectrometer, spectral information from the transmix is generated by the spectrometer and projected in the cartesian space,
    if a distance between the spectral information of the first cluster and the spectral information of the transmix projected in the cartesian space exceeds a pre-determined value, the flow of the transmix is diverted from the pipeline to an alternative pipeline.

2. The fluid infrastructure of claim 1, wherein the spectrometer measures and records spectral information of a fluid flowing through the pipeline in near-real-time.

3. The fluid infrastructure of claim 1, wherein the spectrometer continuously measures and records spectral information of a fluid flowing through the pipeline in situ.

4. The fluid infrastructure of claim 1, wherein the spectral information of the first fluid is projected without measuring specific compositional properties of the first fluid.

5. The fluid infrastructure of claim 1, wherein as the second fluid flows past a point in the pipeline, spectral information from the second fluid is generated by the spectrometer and projected in the cartesian space and, at such time as the spectral information of the second fluid forms a second cluster, flow of the second fluid is diverted from the pipeline to a second alternative pipeline.

6. The fluid infrastructure of claim 1, wherein spectral information from the first fluid and spectral information from the transmix are alternatively projected in a principal component analysis space.

7. The fluid infrastructure of claim 1, wherein spectral information from the first fluid and spectral information from the transmix do not have mathematical preprocessing applied prior to classification.

8. The fluid infrastructure of claim 1, wherein spectral information from the first fluid is collected in the near infrared spectrum.

9. The fluid infrastructure of claim 1, wherein spectral information from the first fluid is collected in the infrared spectrum.

10. The fluid infrastructure of claim 1, wherein spectral information from the first fluid is collected using Raman spectroscopy.

11. The fluid infrastructure of claim 1, wherein the first fluid is a refined petroleum product.

12. The fluid infrastructure of claim 1, wherein the first fluid is crude oil.

13. The fluid infrastructure of claim 1, wherein the first fluid is natural gas.

14. The fluid infrastructure of claim 1, wherein the first fluid is liquified natural gas.

15. A fluid infrastructure, comprising:
- a first fluid flowing through a pipeline in the fluid infrastructure followed by a second fluid flowing through the pipeline, wherein a transmix of the first fluid and the second fluid flows between the first fluid and the second fluid;
- a spectrometer located at a point in a pipeline to measure and record spectral information of fluids flowing through the pipeline without reference to a calibration sample;
- wherein as the first fluid flows past the spectrometer, spectral information from the first fluid is generated by the spectrometer and projected in a principal component analysis space to create a first cluster, wherein a close proximity of spectral information indicates a consistent composition of the first fluid in the pipeline,
- if the spectral information within the first cluster is grouped within a predetermined space, the first fluid is deemed stable and is classified and labeled.

* * * * *